J. RUPERTUS.

Revolving Fire-Arms.

No. 5,631. Reissued Oct. 28, 1873.

Witnesses,

Thomas McKoain
John K Rupertus.

Jacob Rupertus
by his attys.
Howson and Sons

AM. PHOTO-LITHOGRAPHIC Co. N.Y. (OSBORNE'S PROCESS)

UNITED STATES PATENT OFFICE.

JACOB RUPERTUS, OF PHILADELPHIA, PENNSYLVANIA.

IMPROVEMENT IN REVOLVING FIRE-ARMS.

Specification forming part of Letters Patent No. 43,606, dated July 19, 1864; reissue No. 5,631, dated October 28, 1873; application filed May 9, 1873.

*To all whom it may concern:*

Be it known that I, JACOB RUPERTUS, of Philadelphia, county of Philadelphia, State of Pennsylvania, have invented Improvements in Revolving Fire-Arms, of which the following is a specification:

My invention consists of certain improvements, fully described hereafter, in fire-arms having barrels or cylinders containing a number of chambers.

Figure 1:
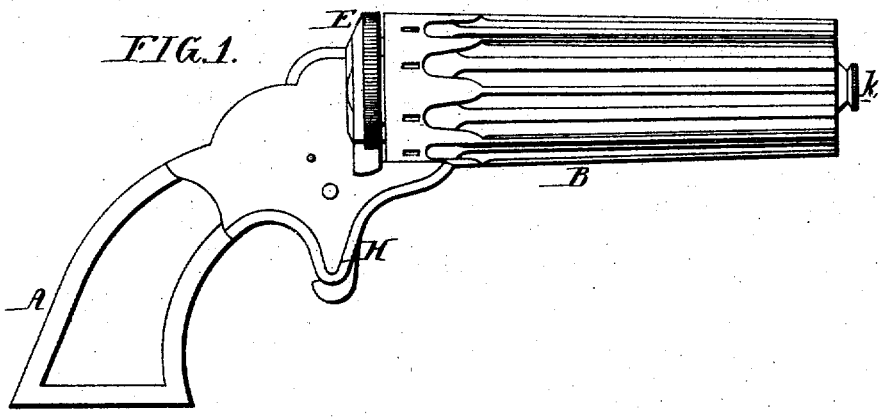
Figure 2:
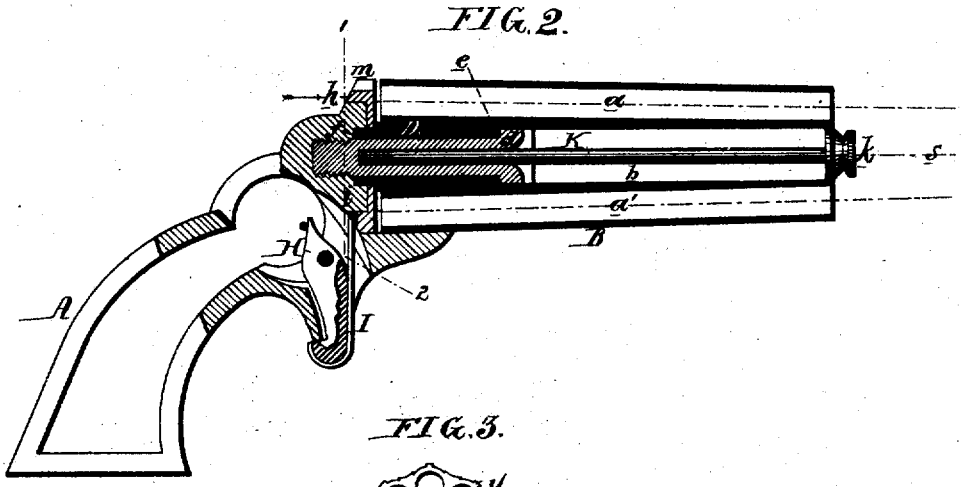
Figure 3:
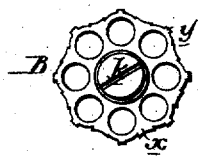
Figure 4:
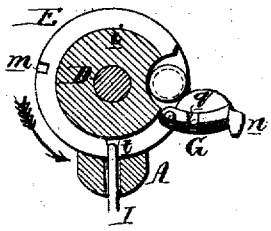

In the accompanying drawing, Figure 1 is a side view of my improved revolving fire-arm; Fig. 2, a longitudinal section; Fig. 3, an end view of the barrel; Fig. 4, a transverse section on the line 1 2, Fig. 2, looking in the direction of the arrow.

A represents the stock and frame, and B the barrel of the latter, having, in the present instance, eight bores or chambers, *a*, arranged in a circle around a central chamber, *b*. D is a tubular breech-pin, on which the barrel turns, the central chamber, *b*, being reduced in diameter near its rear end for the reception of the said breech-pin, the head *d* of which bears against a shoulder, *e*, the outer end being screwed into the frame, and a tubular projection, *f*, at the rear end of the barrel being arranged to fit into and turn in the said frame. Between the frame and the rear end of the barrel intervenes a circular and movable breech-piece, E, a flange, *h*, on which overlaps the edge of a circular plate, *i*, formed on the frame, on which plate, as well as on the tubular projection *f* of the barrel, the breech-piece is arranged to turn to a limited extent. It should be understood that the bores of the barrel are arranged for the reception (at the rear) of the ordinary metallic cartridges, the flanges of which intervene between the rear of the barrel and the breech-piece, a notch, *m*, being cut at one point in the latter to permit the end of the hammer to strike the flange of that cartridge which is contained in the uppermost bore of the barrel. The breech-piece E and the circular plate *i* of the frame are cut away at one point, as seen in Fig. 4, so as to afford room for the introduction of the cartridges into the bores of the barrel. To the breech-piece, near the point thus cut away, is hinged a door, G, which, when closed against the said breech-piece, covers the part thus cut away; but which, when open, as seen in Fig. 4, permits the introduction of the metallic cartridges into the bores of the barrel. This door is provided with a lip or projection, *n*, and has a notch, *q*, which, together with a notch, *t*, at the rear of the breech-piece, will be alluded to hereafter. The rear end of the tubular projection *f* is provided with angular teeth, similar to those on the cylinders of other revolving fire-arms, the teeth being acted on by a dog, which is caused to turn the barrel during the cocking of the hammer.

As the hammer, dog, and lock are similar to those of other revolving fire-arms, it has not been deemed necessary to illustrate them in the drawing.

To the trigger H, which is also of the usual construction, is secured the spring I, the upper and rounded end of which is arranged to engage into the notch *t* of the breech-piece, and into the notch *q* of the door.

It will be observed that the barrel, although containing a large number of bores, is rendered very light by its peculiar construction.

The bores of the barrel, instead of being parallel with the axial line 5, round which the barrel revolves, as in other fire-arms of this class, all converge to one point in this line; in other words, the center of each bore at the front end of barrel is nearer to the axial line 5 than at the rear end of the barrel. By this arrangement, and by the formation of the central chamber, *b*, I have been enabled to form a very light barrel, and yet one of appropriate strength. The barrel is rendered still lighter by removing from its outside, at points *x*, Fig. 3, between the bores, as much metal as possible, taking care to leave at a point parallel with the center of each bore a longitudinal ridge, *y*, by means of which the proper sighting of the fire-arm is effected. A rod, K, passes through the center of the tubular chamber *b*, and fits into the tubular breech-pin D, in such a manner that it can be readily drawn therefrom and used as an instrument for forcing the spent cartridges from the rear of the chambers.

After the breech-piece has been moved to the position shown in Fig. 4 and there lightly held by the spring I, the operator can depress the door G and introduce a cartridge into one of the chambers of the barrel, the latter being turned until a cartridge can be inserted into another chamber, and so on until every chamber is charged, after which the door G is closed, and the breech-piece is turned back in a direction contrary to that pointed out by the arrow, Fig. 4, and until the lip *n* of the door comes in contact with the frame A, and the end of the spring I enters the notch *q*, when the fire-arm is in a condition to be discharged.

In thus loading the fire-arm no accidental discharge of the cartridges can take place, for when the loading is being effected the notch *m* in the breech-piece, through which the hammer must pass, is turned away from the course of the hammer, so that the latter, should it accidentally fall, cannot reach the charged flanges of the cartridges. The same safety can be insured when the loaded fire-arm has to be carried in the pocket, by turning the breech-piece to the position shown in Fig. 4.

It will be evident that the tubular breech-pin for the reception of a discharging-rod and the peculiar method of constructing the barrel are applicable to the cylinders of ordinary revolving fire-arms.

I claim as my invention—

1. The combination, in a fire-arm having a many-chambered revolving cylinder or barrel, of a fixed tubular base-pin and a detachable shell-discharging pin, as specified.

2. A breech-piece, E, intervening between the rear end of the barrel and the frame, and arranged to turn substantially as set forth.

3. The notch *m*, formed at or near the edge of the said breech-piece, as set forth, for the purpose specified.

4. The combination of the said movable breech-piece with the door G or its equivalent.

5. The said movable breech-piece, with its notches *t* and *q*, in combination with the spring I.

In testimony whereof I have signed my name to this specification in the presence of two subscribing witnesses.

JACOB RUPERTUS.

Witnesses:
WM. A. STEEL,
HUBERT HOWSON.